July 28, 1953 J. C. CURTIS 2,646,968

MOBILE DRILLING APPARATUS

Filed Dec. 13, 1947 7 Sheets-Sheet 1

Inventor:
John C. Curtis.
by Charles F. Osgood,
Attorney.

MOBILE DRILLING APPARATUS

Filed Dec. 13, 1947 7 Sheets-Sheet 2

Inventor:
John C. Curtis.
by Charles F. Osgood,
Attorney.

July 28, 1953 J. C. CURTIS 2,646,968

MOBILE DRILLING APPARATUS

Filed Dec. 13, 1947 7 Sheets-Sheet 3

Inventor:
John C. Curtis.
by Charles F. Osgood,
Attorney.

July 28, 1953 J. C. CURTIS 2,646,968

MOBILE DRILLING APPARATUS

Filed Dec. 13, 1947 7 Sheets-Sheet 4

Inventor:
John C. Curtis.
by Charles F. Osgood,
Attorney.

July 28, 1953 J. C. CURTIS 2,646,968

MOBILE DRILLING APPARATUS

Filed Dec. 13, 1947 7 Sheets-Sheet 5

Inventor:
John C. Curtis.
by Charles F. Osgood,
Attorney.

July 28, 1953 J. C. CURTIS 2,646,968

MOBILE DRILLING APPARATUS

Filed Dec. 13, 1947 7 Sheets-Sheet 6

Inventor:
John C. Curtis.
by Charles F. Osgood
Attorney.

July 28, 1953 J. C. CURTIS 2,646,968

MOBILE DRILLING APPARATUS

Filed Dec. 13, 1947 7 Sheets-Sheet 7

Inventor:
John C. Curtis.
by Charles F. Osgood,
Attorney.

Patented July 28, 1953 2,646,968

UNITED STATES PATENT OFFICE 2,646,968

MOBILE DRILLING APPARATUS

John C. Curtis, Claremont, N. H., assignor to Joy Manufacturing Company, a corporation of Pennsylvania Application December 13, 1947, Serial No. 791,529

21 Claims. (Cl. 255—51)

This invention relates to mobile drilling apparatus and more particularly to improved self-propelled, rubber-tired drill jib mountings for hammer rock drills.

In mobile rock drilling apparatus of the kind which employs adjustable supports such as swivelled drill jibs or booms for supporting the hammer rock drills with respect to the work, it has been customary to mount the drill jibs or booms on a wheeled truck adapted to travel along a trackway, and the apparatus was suitably hauled, as by a locomotive or other haulage means, about the mine or tunnel. Moreover, in such drilling apparatus, the drill jibs or booms are adjusted to vary the elevation of the drills by manually operated means, lacking the desired ease in operation. The present invention contemplates improvements over previous known types of mobile drilling apparatus in that the drill jibs or booms are mounted on a self-propelled, rubber-tired truck adapted to travel over the ground without the aid of a guiding trackway, and having novel propelling and steering means whereby the apparatus may be readily moved about the mine or tunnel and maneuvered with respect to the working face. Further, in one embodiment, the drill jibs or booms are power operated so that the elevation of the drills may be expeditiously varied as desired. The drill jibs or booms are mounted on the body of the apparatus, and the body is provided with improved means for maintaining the same substantially horizontal during movement of the apparatus over an uneven ground surface or floor. The apparatus of the present invention is hydraulically operated and embodies a hydraulic system including pumping means driven by a motor which is provided with an automatic reeling mechanism for the power conductor element. Accordingly, the improved mobile drilling apparatus of the present invention is self-contained and may be readily moved by self-propelling means about the mine or tunnel and positioned with respect to the working face and quickly set up and adjusted with a minimum of time and effort.

It is an object of the present invention to provide an improved mobile drilling apparatus. Another object is to provide an improved self-propelled, rubber-tired drill jib mounting for hammer rock drills. A further object is to provide an improved mobile drilling apparatus mounted on rubber-tired wheels adapted to travel over the ground or floor without the aid of a guiding trackway and having novel propelling and steering means. Yet another object is to provide an improved self-contained mobile drilling apparatus having improved power operated means for adjusting the drills with respect to the working face. A still further object is to provide an improved mobile drilling apparatus of the hydraulically operated type embodying a hydraulic system including motor driven pumping means and improved control valve means whereby the apparatus may be readily controlled. Another object is to provide an improved rubber-tired wheel mounting for a mobile drilling apparatus and embodying novel means for mounting the apparatus on the wheel frames whereby the body of the apparatus is automatically maintained substantially horizontal during movement of the apparatus over an uneven ground surface or floor. Still another object is to provide improved jack devices associated with the wheel mounting for holding the apparatus steady during the drilling operation. A further object is to provide an improved mobile drilling apparatus having a novel arrangement and combination of parts. These and other objects and advantages of the invention will, however, hereinafter more fully appear in the course of the ensuing description.

In the accompanying drawings there are shown for purposes of illustration two forms which the invention may assume in practice.

Figures 1, 2:
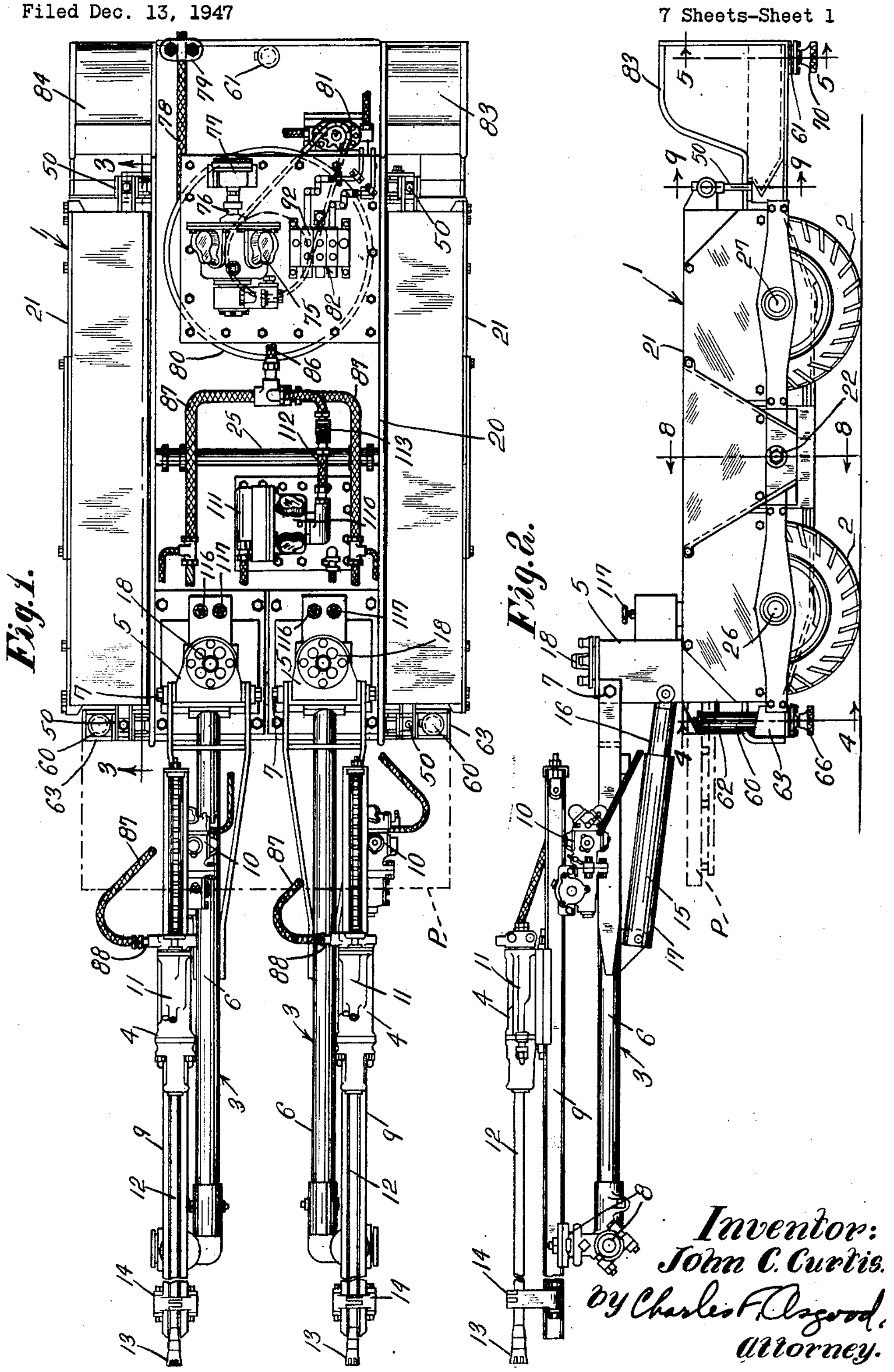
Fig. 1 is a plan view of a mobile drilling apparatus constructed in accordance with a preferred illustrative embodiment of the invention.
Fig. 2 is a side elevational view of the drilling apparatus shown in Fig. 1.

In both illustrative embodiments of the invention, there is shown a mobile drilling apparatus embodying a self-propelled, mobile base mounted on rubber tired wheels adapted to travel over a ground surface without the aid of a guiding trackway, and carrying a pair of swiveled drill jibs or booms, by which hammer rock drills are carried. Evidently, the invention may be associated with other types of drilling apparatus and may support drilling tools other than hammer rock drills.

In the preferred illustrative embodiment, as shown in Figs. 1 to 10 inclusive, the drilling apparatus includes a self-propelled mobile base, generally designated 1, of a low, compact design, mounted in an improved manner on rubber tired wheels 2 and carrying adjustable drill supports, herein swiveled drill jibs or boom mountings, generally designated 3, which support conventional drilling tools such as hammer rock drills 4. The drill jib mountings 3 may be generally similar to those disclosed in my copending application, Serial No. 563,579, filed November 15, 1944, now matured into Patent No. 2,500,931, granted on March 21, 1950, and each comprises a frame 5 swiveled to turn about a vertical axis relative to the base and carrying an elongated jib or boom 6 pivoted at 7 on a horizontal axis to swing in vertical planes with respect to the swivel-frame. Swivelly mounted at 8 at the outer extremity of the jib for adjustment relative thereto about rectangularly related axes is an elongated guide frame 9 on which the hammer rock drill is guided for movement longitudinally therealong. A feed motor 10, preferably an air motor carried by the guide frame, serves to feed the rock drill back and forth along the guide frame in a manner described in my Patent No. 2,365,749, patented December 26, 1944. The hammer rock drills each include a hammer motor 11 of a conventional design for percussively actuating a drill steel 12 carrying a usual drill bit 13. Suitable centralizer means 14, carried at the forward end of the guide frame, guides the drill steel during "spotting" or starting of a hole in a well known manner, and such centralizer means may be detached from the steel after the hole is started. The jib or boom 6 of each drill jib mounting is adjustable in vertical planes about its pivot 7 by an extensible hydraulic jack device 15, having a cylinder 16 pivotally connected to the swivel frame 5 and containing a reciprocable piston having its piston rod 17 pivotally connected to the underside of the boom. Thus, when liquid under pressure is supplied, in a manner to be later described, to the jack devices, the jibs may be swung upwardly to vary the elevation of the rock drills, and liquid may be trapped in the jack devices to lock the drill jibs in adjusted positions. Coaxial with the vertical swivel of each drill jib is a locking device 18 for locking the swivel-frame 5 in adjusted position on its swivel mounting. Since these drill jib mountings are fully described in the copending application above referred to, further detailed description thereof is herein unnecessary.

Figure 3:
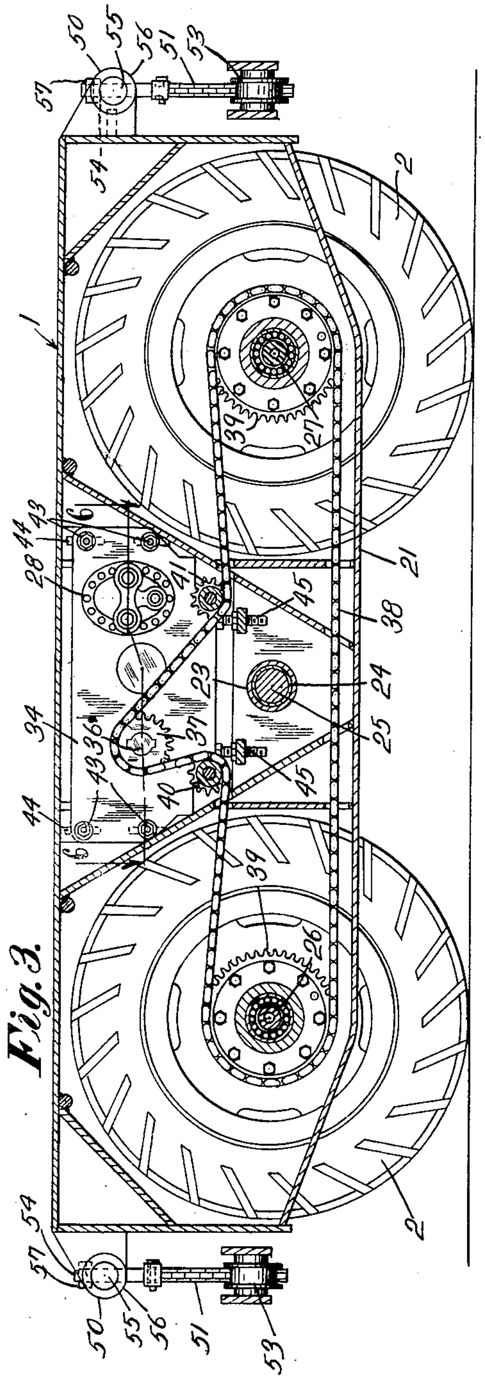
Fig. 3 is an enlarged view in longitudinal vertical section taken substantially on line 3—3 of Fig. 1.
Figure 5:
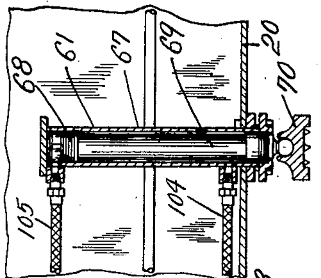
Fig. 5 is an enlarged detail transverse vertical sectional view taken substantially on line 5—5 of Fig. 2.
Figure 4:
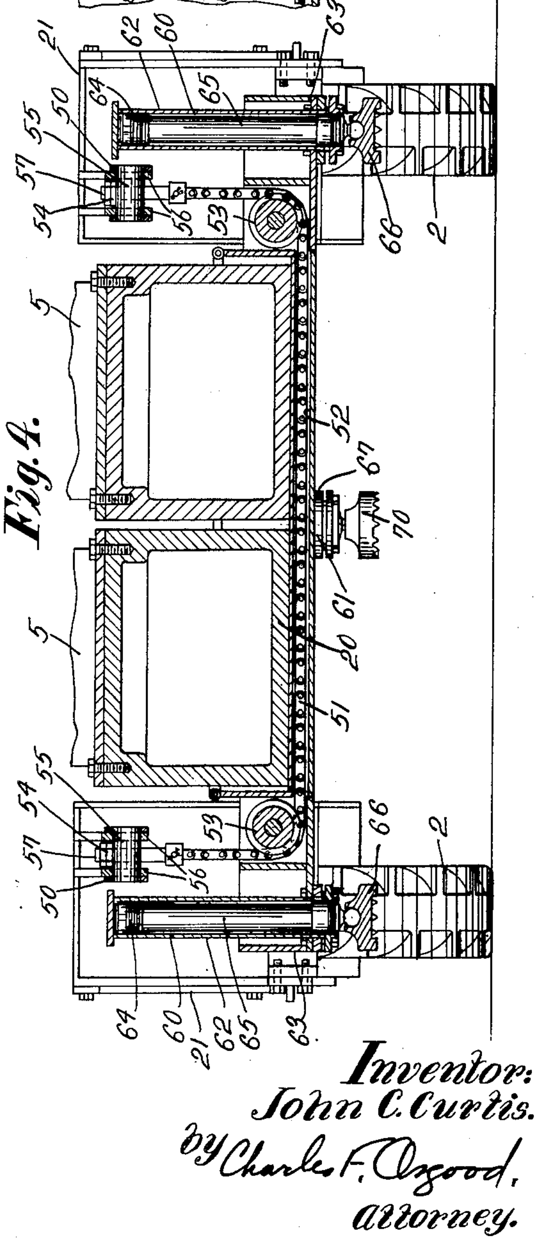
Fig 4 is an enlarged cross-sectional view taken substantially on line 4—4 of Fig. 2.
Figure 6:
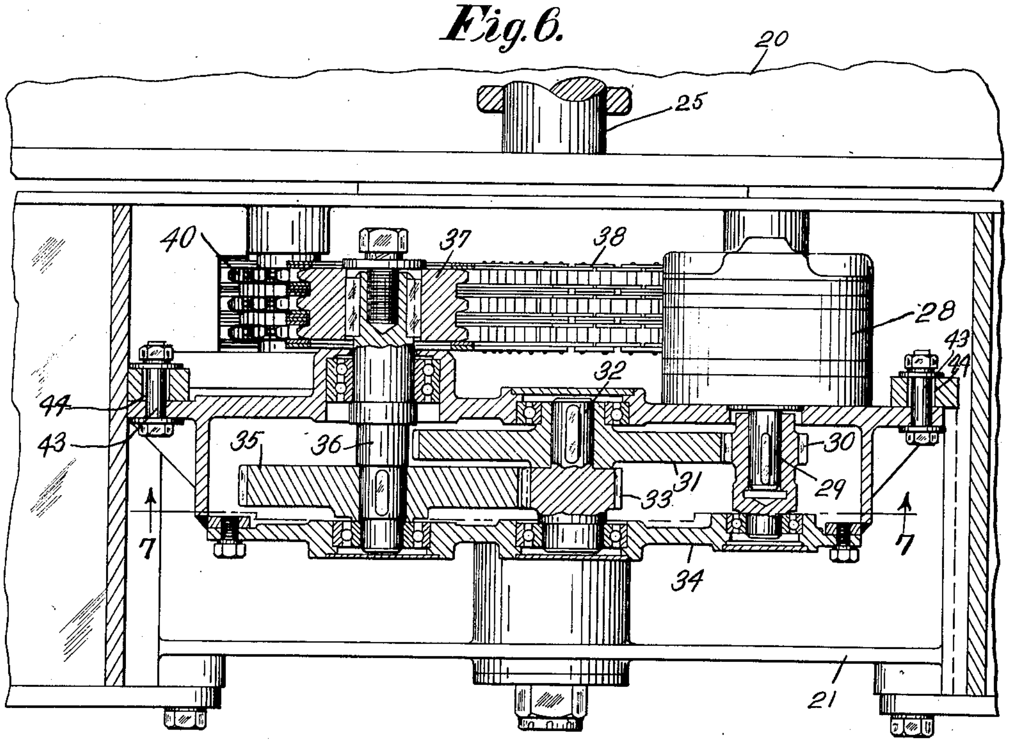
Fig. 6 is an enlarged horizontal sectional view taken substantially on line 6—6 of Fig. 3.
Figure 7:
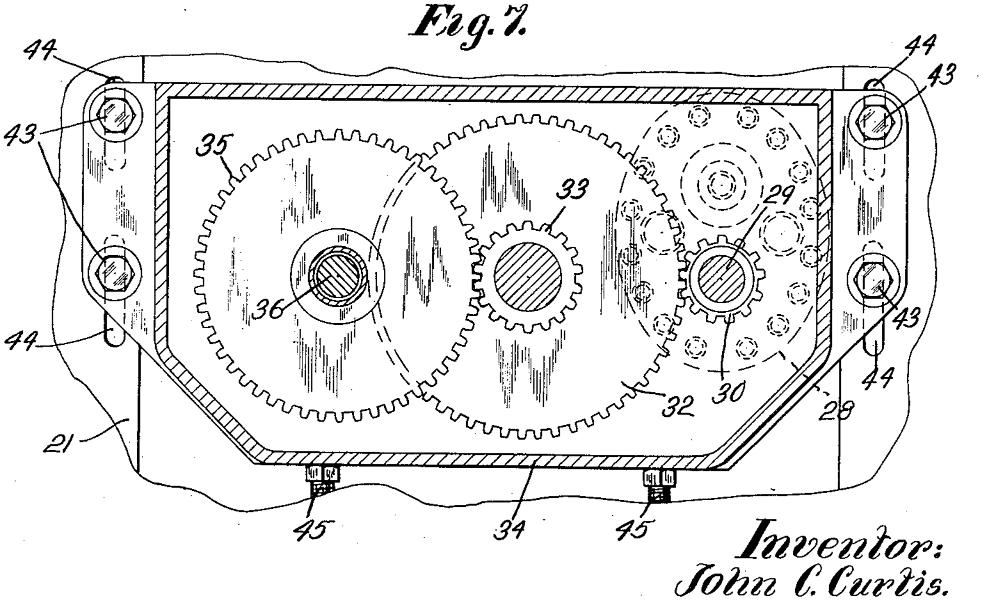
Fig. 7 is a longitudinal vertical sectional view taken substantially on line 7—7 of Fig. 6.
Figure 8:
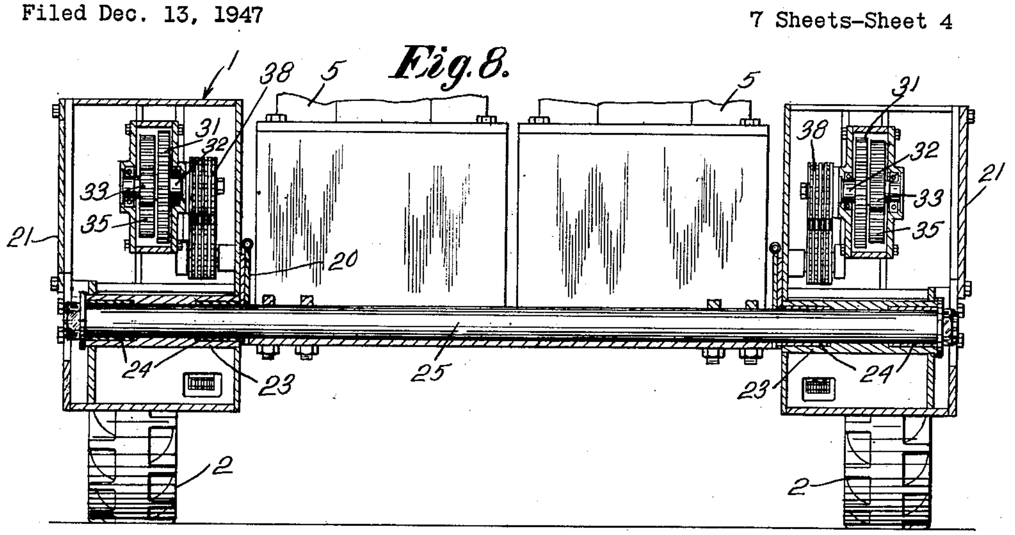
Fig. 8 is an enlarged cross-sectional view taken substantially on line 8—8 of Fig. 2.

Now referring to the improved self-propelled rubber tired base 1, it will be observed that a horizontal frame or body 20, preferably of a fabricated welded construction, is arranged centrally between side frames 21, likewise preferably of a fabricated welded construction; and the central body 20 is pivoted at 22 on a transverse horizontal axis midway between the ends of the side frames, as shown in Figs. 2 and 8. The side frames have tubular bearing supports 23 secured thereto, as by welding, which carries suitable bearings, herein bearing sleeves 24, in which a transverse pivot shaft 25 is journaled. This pivot shaft traverses the central frame or body 20, as shown in Fig. 8, and is suitably secured to the body, preferably by U-bolts. Thus, there is relative rocking movement between the central body 20 and the side frames 21. The side frames carry front and rear axles 26 and 27 on which the wheels 2 are journaled. The wheels of each side frame are operatively connected together in pairs, and the side frames each carry a motor 28 for driving the wheels. Each motor 28 is of the conventional reversible hydraulic type and has fixed to its power shaft 29 (Fig. 6) a spur pinion 30 meshing with a spur gear 31, in turn having its hub keyed to a shaft 32 to which a spur pinion 33 is integrally secured. The gear hub and the shaft are suitably journaled in bearings supported within the sides of a gear housing 34 carried within the side frame and which supports the motor 28. The pinion 33 meshes with and drives a spur gear 35 keyed to a parallel shaft 36, likewise suitably journaled within the gear housing 34. Keyed to the inner end of the shaft 36 is a chain sprocket 37 which is connected by an endless drive chain 38 to sprockets 39 secured to the wheel hubs (Fig. 3). The drive chain passes from the drive sprocket 37 around suitable guide sprockets 40 and 41 mounted on the inner side of the side frame, and the chain extends from these guide sprockets longitudinally in opposite directions to the wheel sprockets 39 (as shown in Fig. 3). The gear housings 34 are mounted for vertical adjustment on the side frames to enable variation in the tension of the drive chains and carry bolts 43 passing through vertical slots 44 in the side frames. Suitable stop screws 45 on the side frames engage the bottoms of the gear housings to hold the gear housings against downward movement when properly adjusted and the bolts 43 are tightened. Thus, the motors 28 may drive the wheels in pairs, and by appropriately controlling the relative speeds of the motors, the wheels may serve as steering means for the base. The control means for these motors will be later described. The wheels of the base may be provided with conventional hydraulic brakes, although, under most circumstances, the hydraulic motors 28 may be employed to brake wheel rotation. As shown in construction lines in Figs. 1 and 2, a suitable platform P may be pivotally or otherwise attached to the front end of the central body 20, beneath the drill jib supports, and the drill operator may stand on this platform during the drilling operation. This platform may be folded down or detached during transport of the apparatus, or when it is not in use.

Figure 9:
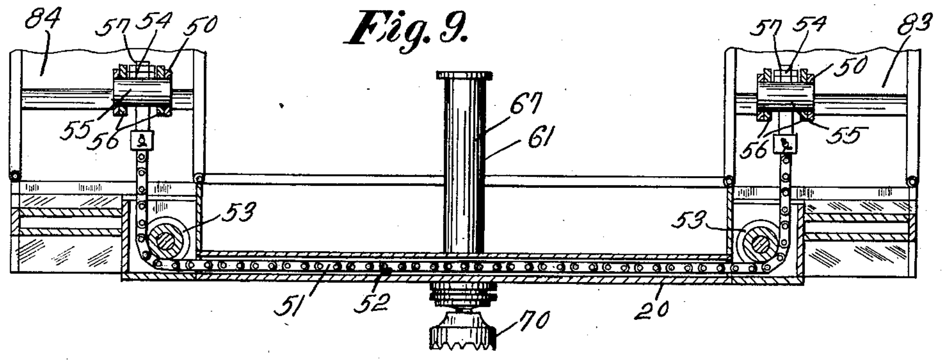
Fig. 9 is an enlarged detail cross-sectional view taken substantially on line 9—9 of Fig. 2.

In order to maintain the central frame or body 20 substantially horizontal as the base moves over an uneven ground surface or floor, there are provided equalizer devices 50, 50 between the opposite ends of the side frames and the central body. These equalizer devices may assume various forms but herein each comprises a pivoted link chain section 51 (see Figs. 4 and 9) extending transversely across the lower portion of the body through a transverse passageway 52, and the end portions of this chain section pass around guide rollers 53 arranged on longitudinal axes at the sides of the body. The end portions of the chain section extend upwardly from the guide rollers, as shown, and the ends of the chain section are attached at 54 to horizontal swivel pins 55 supported in lugs 56 integral with the ends of the side frames, as shown in Figs. 3 and 9. Thus, as the side frames rock up and down about their pivots relative to the central body of the base, the equalizer devices 50 automatically maintain the body in a substantially horizontal position. The attaching means at 54 includes screw and nut adjusting devices 57 associated with the pins 55 for adjusting the effective length of the equalizer chain sections 51.

The body of the base of the apparatus may be firmly jacked in position to hold the base steady during the drilling operation by a pair of extensible front jack devices 60 and an extensible rear jack device 61. The front jack devices include vertical cylinders 62 carried by lateral brackets 63 (see Fig. 4) secured to the opposite sides of the front end of the central body 20, and pistons 64, reciprocable in these cylinders, have piston rods 65 extending downwardly through the lower packed cylinder heads. Attached to the lower ends of the piston rods are foot pieces 66 engageable with the ground surface or floor when the pistons are lowered. The rear jack device 61 is located midway between the sides of the rear end of the body and includes a vertical cylinder 67 secured, as by welding, to the body and containing a reciprocable piston 68 having its piston rod 69 extending downwardly through the lower packed cylinder head and carrying a foot piece 70, likewise engageable with the ground surface or floor when the piston is lowered. Thus, the weight of the apparatus may be substantially removed from the rubber tired wheels when the jack devices are in their lowered operative positions. The control means for these jack devices will later be described.

Carried by the central body 20 of the base is a motor 75 which may be either an air motor, as shown, or an electric motor; and this motor has its power shaft 76 connected to a conventional hydraulic pump 77. A power conductor element 78, which may be an air hose when an air motor is used, or an electric conductor cable when an electric motor is employed, is attached at its free end to a suitable source of power and passes through a conventional roller guide 79 at the rear end of the body 20. This power conductor element is wound on a reeling mechanism 80 of a conventional design, driven by a conventional hydraulic motor 81. The reel mechanism may be similar to that disclosed in a copending application Serial No. 571,991, filed January 9, 1945, now matured into Patent No. 2,593,367, granted April 15, 1952, and owned by the same assignee as the present invention. The power conductor element is connected in a usual manner through the reeling mechanism to the pump driving motor 75. As the base is propelled forwardly, the power conductor element 78 is drawn off of the reeling mechanism 80, and when the base is moved in the reverse direction, the hydraulic motor 81 drives the reeling mechanism in a direction to wind in the conductor element in a well known manner. Mounted on the body 20 at one side of the motor 75 is a conventional valve mechanism, generally designated 82, which is conveniently located adjacent the operator's station at 83 at the rear end of the adjacent side frame. A station at 84 at the rear end of the other side frame is provided for the operator's helper. The stations 83 and 84 may be in the form of seats or compartments so that the operator and his helper may assume a relatively comfortable position during transport of the apparatus. Compressed air may be supplied through a hose connection 86 and branch hose connections 87, 87 to the air inlet connections 88 of the hammer motors 11 of the rock drills 4 and to the feeding motors 10, and the hose connection 86 may be separately connected to a suitable source of compressed air or may be connected through the reeling mechanism 80 to the conductor element 78 when a compressed air type, pump driving motor is employed.

Figure 10:
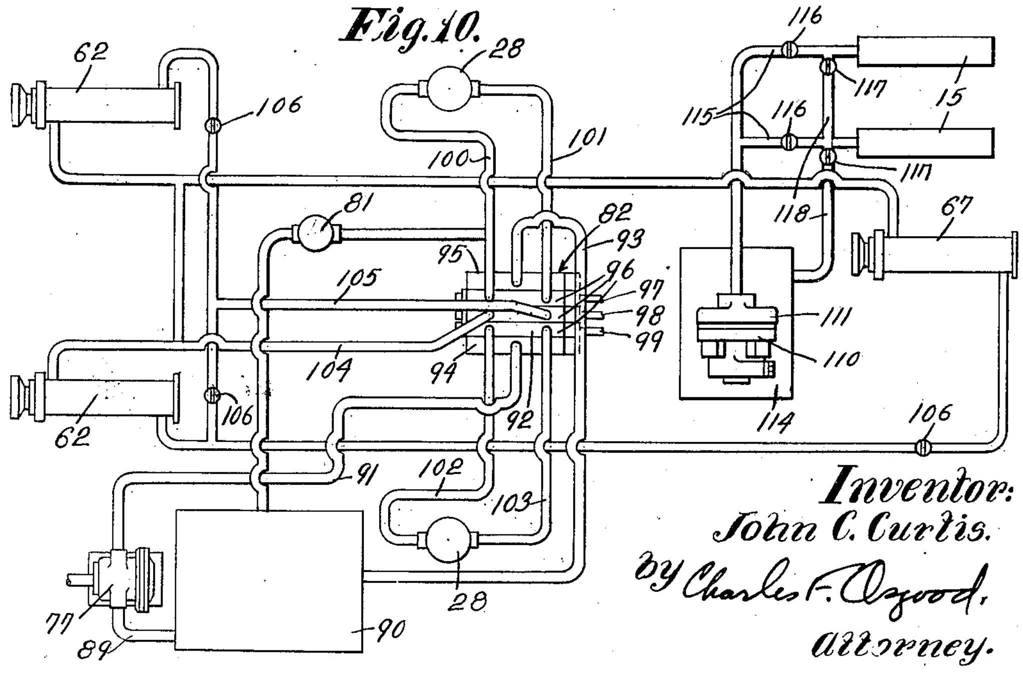
Fig. 10 is a diagrammatic view of the hydraulic system of the preferred embodiment.

Now referring to the hydraulic system shown diagrammatically in Fig. 10, it will be observed that the pump 77 has its intake connected by a conduit 89 to a liquid reservoir or tank 90 carried by the central body 20, and the pump discharge is connected by a conduit 91 to the supply passage of the horizontal valve box 92 of the valve mechanism 82. The discharge passage of this valve box is connected by a return conduit 93 back to the tank. The valve box is preferably composed of a plurality of valve box sections suitably secured together, and the end section 94 has an inlet chamber with which the conduit 91 communicates. The opposite end section 95 of the valve box has a discharge chamber communicating with the return conduit 93. The intermediate valve box sections 96 have longitudinal bores containing conventional slide valves 97, 98 and 99. The box section containing the slide valve 97 has its valve-receiving bore connected by conduits 100 and 101 to the opposite sides of one of the reversible wheel driving motors 28, while the box section containing the slide valve 99 has its valve-receiving bore connected by conduits 102 and 103 to the opposite sides of the other reversible wheel driving motor 28. The central box section containing the slide valve 98 has its valve-receiving bore connected by a conduit 104 to the lower ends of the jack cylinders 62 and 67 and by a conduit 105 to the upper ends of the jack cylinders. The conduit 105 leading to the upper ends of the jack cylinders is provided in its branches with suitable hand valves 106 whereby liquid may be trapped in the jacks. Thus, the wheel driving motors 28, 28 may be independently controlled by the slide valves 97 and 99, while the jack devices may be concurrently extended and retracted under the control of the slide valve 98. Mounted on the central body 20 of the base is an air motor 110 which drives an auxiliary hydraulic pump 111 for supplying liquid under pressure to the jack devices 15 of the drill jib mountings. The hose connection 86 has a branch connection 112, controlled by a hand valve 113, which supplies compressed air to the air motor 110 when the hose connection 86 is connected to its source of compressed air. The pump 111 has its intake connected to a liquid tank 114 and its discharge connected through branch conduits 115, 115 to conventional hand valves 116 carried by the swivel-frames 5, and leading from similar hand valves 117 are conduits 118 connected back to the tank so that liquid may be discharged from the jack devices 15, or may be trapped therein, when desired.

Figures 11, 12:
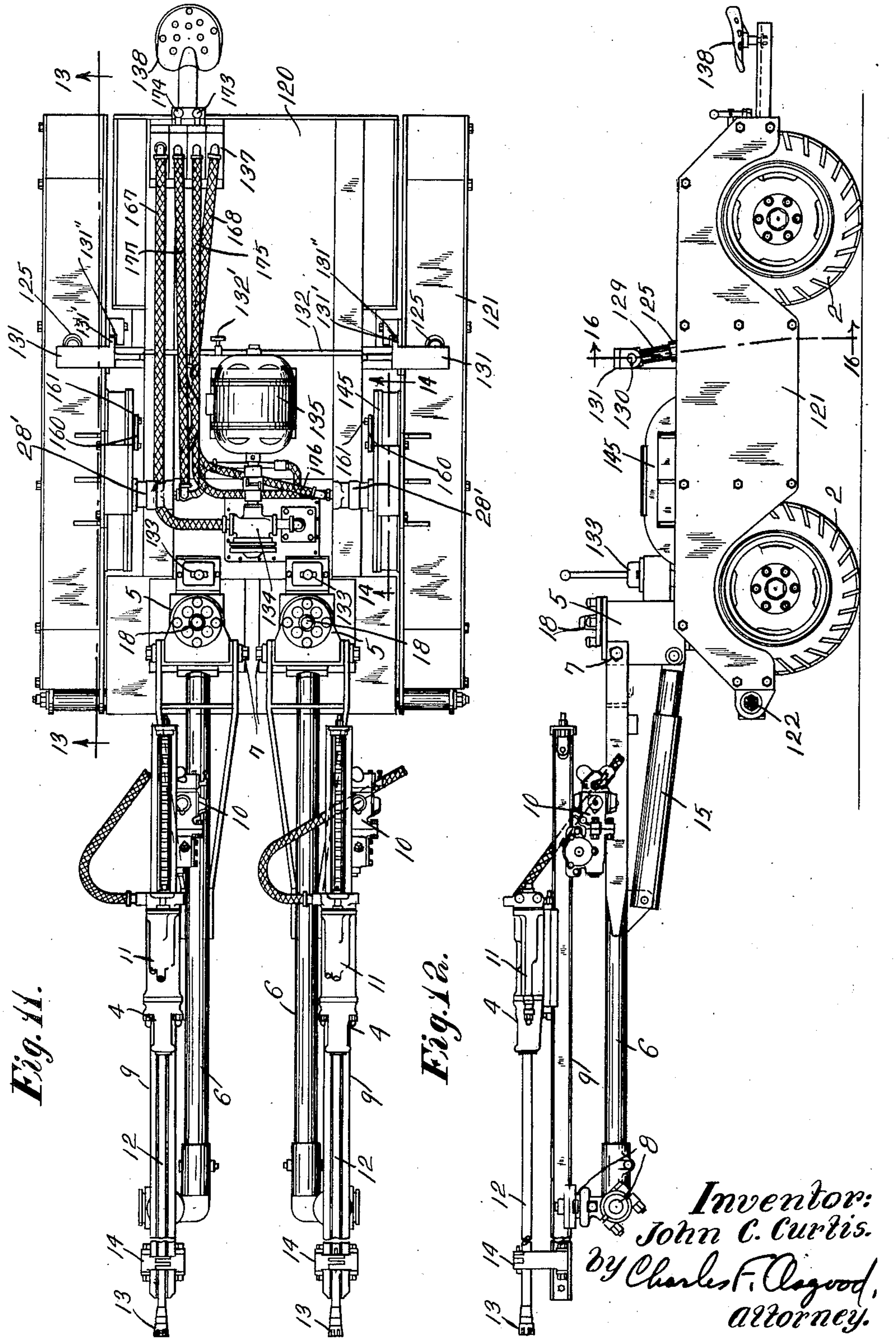
Fig. 11 is a plan view of a mobile drilling apparatus constructed in accordance with another illustrative embodiment of the invention.
Fig. 12 is a side elevational view of the drilling apparatus shown in Fig. 11.
Figure 13:
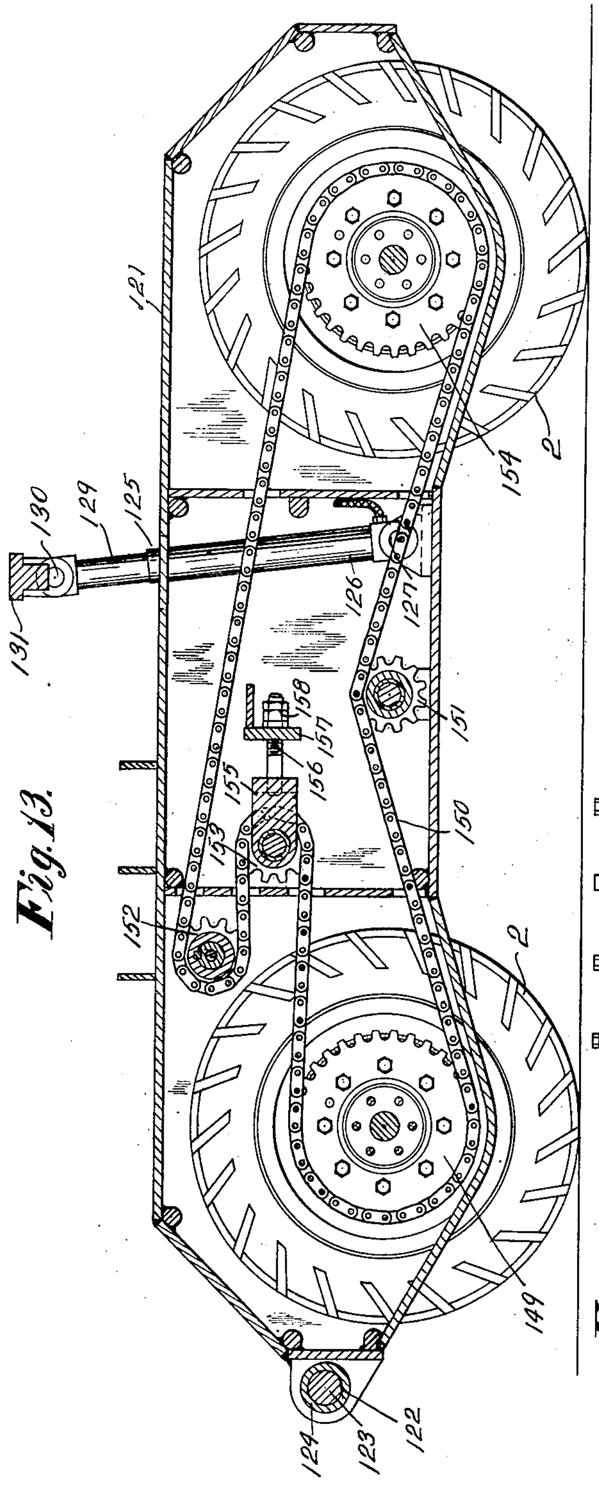
Fig. 13 is an enlarged view in longitudinal vertical section taken substantially on line 13—13 of Fig. 11.
Figure 15:
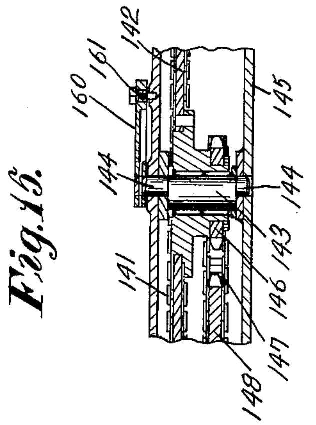
Fig. 15 is a detail horizontal sectional view taken on line 15—15 of Fig. 14.
Figure 14:
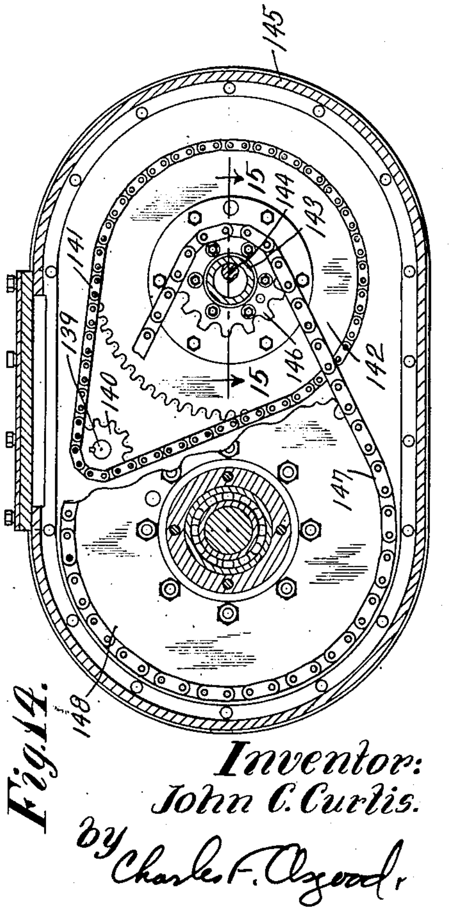
Fig. 14 is a longitudinal vertical sectional view taken substantially on line 14—14 of Fig. 11.
Figure 16:
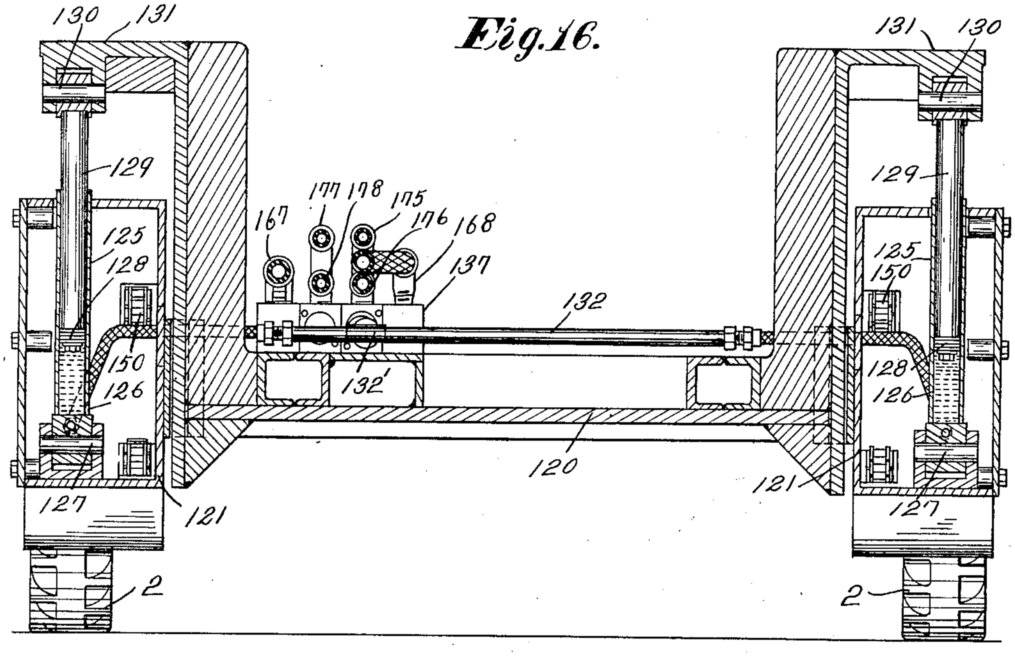
Fig. 16 is an enlarged cross-sectional view taken substantially on line 16—16 of Fig. 12.

In the modified embodiment shown in Figs. 11 to 17 inclusive, the self-propelled mobile base structure and the drill jib mountings thereon are similar to those of the preferred embodiment above described. In this construction, the equalizer chain devices are omitted and hydraulic equalizer devices substituted therefor to maintain the central body 120 of the base substantially horizontal during travel of the base over an uneven ground surface or floor. The central frame or body 120 of the base is pivotally mounted at the front ends of the side frames 121, as at 122 (Fig. 13), on transverse horizontal axis. The pivots include horizontal shafts 123 suitably secured to the side frames and on which tubular bearing elements 124 on the central body are pivotally mounted. The hydraulic equalizer devices of this embodiment comprise, as shown in Figs. 13 and 16, upright extensible hydraulic equalizer jacks 125 arranged rearwardly of the longitudinal center of the base at the opposite sides of the central body. These equalizer jacks include upright cylinders 126 pivotally mounted at 127 on the lower portions of the side frames, and these cylinders contain reciprocable pistons 128 having piston rods 129 extending upwardly through the upper ends of the cylinders. The piston rods are pivotally connected at 130 at their upper ends to brackets 131 projecting laterally from the upper sides of the central body 120. These brackets have vertical guides 131' received in guideways 131'' on the inner sides of the side frames 21, for guiding the latter. The lower ends of the cylinders are connected together by a free bypass conduit 132 extending across the central body, as shown in Fig. 16. A valve 132' (Fig. 11) in the bypass conduit may be closed to interrupt flow of liquid between the cylinders 126 to lock the equalizer devices in position. Thus, the rear wheels may be held by closing this valve, either in raised or lowered position, and to steady the base during drilling. Thus, when the side frames rock up and down relative to the central body, the liquid acting through the bypass conduit 132 between the lower ends of the cylinders beneath the pistons will automatically maintain the central body 120 in a substantially horizontal position. The swiveled drill jib mountings in this modified construction have their jibs or booms 6 elevated by liquid under pressure supplied to the jack devices 15 by hand pumps 133 on the swivel-frames 5 in the manner disclosed in the copending application, Serial No. 563,579, instead of by liquid supplied to the jack devices by a motor driven pump, as in the preferred embodiment above described. A hydraulic pump 134 on the central body 120 is driven, in this instance, by an electric motor 135, as shown in Fig. 11, and liquid under pressure may be supplied to the reversible hydraulic wheel driving motors 28' under the control of a conventional valve mechanism 137, located at the rear end of the central body 120 near the operator's station, which is provided by a seat 138. As shown in Fig. 14, the hydraulic motors 28' each has fixed to its power shaft 139 a chain sprocket 140 which is, in turn, connected by an endless drive chain 141 to a large chain sprocket 142. The sprocket 142 has its hub journaled on bearings supported by a shaft 143 which has aligned eccentric end portions 144 mounted within the sides of a gear housing 145 secured to the side frame. Secured to the hub of the sprocket 142 is a sprocket 146 which is connected by an endless drive chain 147 to a large chain sprocket 148. Secured to the hub of the sprocket 148 is a sprocket 149 which is secured to a front wheel. An endless chain 150, guided by sprockets 151, 152 and 153 on the adjacent side frame, engages the sprocket 149 and a sprocket 154 secured to a rear wheel. The guide sprocket 153 is mounted on an adjustable block 155 secured to an adjusting screw 156 which passes through an opening in a support 157 secured to the side frame. Threaded on the adjusting screw are adjusting and locking nuts 158 for adjusting the block 155 to vary the position of the idler 153, thereby to vary the tension of the drive chain 150. One eccentric end portion 144 of each shaft 143 has a lever 160 secured thereto and provided with a suitable detent device 161. The lever 160 may be adjusted to turn the shaft 143 on its eccentric portions 144, thereby to change the position of the sprockets 142 and 146 to vary the tension of the drive chains 141 and 147. The detent device 161 serves to lock the lever 106 in its different positions of adjustment.

Figure 17:
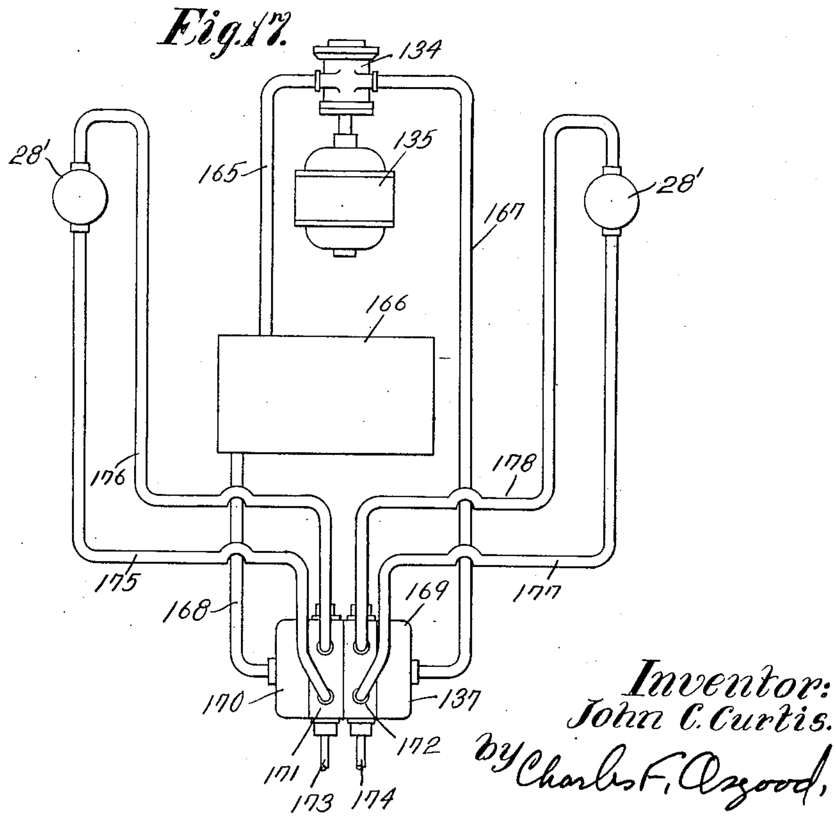
Fig. 17 is a diagrammatic view of the hydraulic system of the modified embodiment.

Referring to the hydraulic system of the modified embodiment, as shown diagrammatically in Fig. 17, the pump 134 has its intake connected by a conduit 165 to a liquid reservoir or tank 166, and the pump discharge is connected by conduit 167 to the pressure passage of the valve box 137 of the valve mechanism. The discharge passage of the valve box is connected by a return conduit 168 back to the tank. The valve box includes inlet and discharge end sections 169 and 170 and intermediate connections 171 and 172 which have longitudinal bores containing conventional slide valves 173 and 174. The box section 171 has its valve-receiving bore connected by conduits 175 and 176 to the opposite sides of one of the reversible wheel driving motors 28', while the other box section 172 has its valve-receiving bore connected by conduits 177 and 178 to the opposite sides of the other reversible wheel driving motor 28'. By suitable positioning of the slide valves 173 and 174, liquid under pressure may be independently supplied to the wheel driving motors to effect propulsion and steering of the base.

The general mode of operation of the preferred embodiment of the drilling apparatus above described is as follows: The apparatus may be propelled about the mine or tunnel under the propulsion of the wheel driving motors 28 under the control of the slide valves 97 and 99, and by suitably varying the liquid supply to these motors to vary their relative speeds, the apparatus may be steered by the driving wheels. Since the driving wheels at the sides of the base are connected together in pairs and are driven by independent motors, they act, during steering, in a manner quite like that of endless crawler treads, and there is, accordingly, some side slippage or skidding of the driving wheels during such steering. However, since the major portion of the weight of the apparatus, due to the forward location of the drill jib mountings on the base, is taken by the front driving wheels, the rear driving wheels, during steering, comparatively easily skid sidewise through a wide arc with little detriment to the treads of the rubber tires. Also, due to the balancing of the weight on the base in the manner disclosed so that comparatively little weight is taken by the rear wheels, steering of the base is made quite rapid so that ready maneuvering of the apparatus through the relatively restricted and curved passageways of a mine or tunnel is possible. As the apparatus moves forwardly toward the working face, the power conductor element 78 is drawn off of the reeling mechanism 80 under suitable tension, and whenever liquid is supplied to the wheel driving motors 28 to propel the apparatus rearwardly away from the working face, liquid is concurrently supplied to the hydraulic motor 81 to drive the reeling mechanism 80 in a direction to wind in the power conductor element 78. As the apparatus travels over an uneven ground surface, the wheel side frames 20 may rock up and down on their pivots 22 relative to the central body 20, and the equalizer chain devices 50 serve automatically to maintain the central body 20 in a substantially horizontal position so that the drill jib swivels are maintained substantially vertical in a desired manner. When the working face is reached, the floor jack devices 60 and 61 may be extended under the control of the slide valve 98 into engagement with the ground surface or floor to remove a major portion of the weight of the apparatus from the rubber-tired wheels, thereby to hold the apparatus steady during operation of the rock drills. These floor jacks are, of course, retracted during propulsion of the apparatus. When the apparatus is in drilling position, the power conductor element 78, particularly when the motor 75 is an electric motor, may be cut off from its power source and, at that time, when compressed air is supplied to the hose connection 86 leading to the hammer rock drill motors 11 and the feeding motors 10, compressed air may also be supplied by the opening of valve 113 to the air motor 110 which drives the auxiliary pump 111. Liquid under pressure may be supplied from the pump 111 under the control of the hand valves 116 to the jack devices 15 of the drill jib mountings to swing the drill jibs 6 upwardly to adjust the rock drills 4 to the desired elevation with respect to the working face. By trapping liquid within the jack devices 15 by closing the hand valves 116, the drills may be firmly locked in adjusted position, and by connecting the jack devices to exhaust under the control of the hand valves 117, the drill jibs may be quickly lowered when desired.

The mode of operation of the modified embodiment above described is quite like that of the preferred embodiment in that the apparatus is similarly propelled and steered and that the drill jibs are adjusted to position the work drills with respect to the work in a like manner. As the apparatus of the modified embodiment travels over an uneven ground surface or floor, the side frames 121 rock up and down about their front pivots 122, and the liquid acting through the bypass conduit 132 between the cylinders 126 beneath the pistons 128 serves to move the pistons automatically to maintain the central body 120 substantially horizontal, in a manner quite like the equalizer chain devices 50 of the preferred embodiment, so that the drill jib swivels are maintained substantially vertical. The valve 132′ in the bypass conduit may be closed to lock the equalizer devices in position, to steady the base during the drilling operation.

As a result of this invention, an improved mobile drilling apparatus is provided which is self-propelled and which may be quickly and easily adjusted to obtain a wide range of adjustment of the hammer rock drills with respect to the work. By mounting the apparatus on rubber-tired wheels in the manner disclosed, and by associating the automatic equalizer devices with the tiltable wheel frames and central body which supports the swiveled jib mountings, the central body is automatically maintained substantially horizontal as the apparatus travels over an uneven ground surface or floor. It will further be evident that by driving the rubber-tired wheels of the base in pairs by separate driving motors and by distributing the weight of the apparatus with respect to the wheels in the manner disclosed, the apparatus may not only readily be propelled but may also readily be steered, enabling rapid maneuvering of the apparatus as it travels about a mine or tunnel, or during positioning of the rock drills with respect to the work. These and other advantages of the invention will be clearly apparent to those skilled in the art.

While there are in this application specifically described two forms which the invention may assume in practice, it will be understood that these forms are shown for purposes of illustration and that the invention may be further modified and embodied in various other forms without departing from its spirit or the scope of the appended claims.

What I claim as new and desire to secure by Letters Patent is:

1. In a drilling apparatus, a mobile base having pairs of traction wheels at its sides for supporting, propelling and steering said base, drill supporting means carried at the forward end of said base above the front wheels near the center of gravity of the apparatus, a drilling tool carried by said supporting means, means for driving said side wheels including a motor for each pair of wheels at each side of said base, said drilling tool and said supporting means substantially counterbalancing the weight of the apparatus rearwardly of said supporting means with the weight so distributed that the front traction wheels receive a major portion of the weight, and means for independently controlling said motors to vary their relative speeds to effect propulsion and steering of the apparatus by said pairs of wheels, the rear traction wheels which receive only a small portion of the weight of the apparatus skidding sidewise as they are driven during the steering operation, to swing the apparatus horizontally about the points of contact of the front traction wheels with the ground surface.

2. In a drilling apparatus, a mobile base comprising side frames mounted for relative tilting movement and a central body pivotally mounted on said side frames, to provide for relative rocking movement in vertical planes between said side frames and said central body, drill supporting means carried by said central body, supporting and propelling means by which said side frames are supported, and equalizer means including an equalizer element extending between and connected to said side frames and extending across said body in engagement with the latter for maintaining said body substantially horizontal irrespective of the tilted positions of said side frames relative to said body as said supporting and propelling means travel over an uneven ground surface or floor.

3. In a drilling apparatus, a mobile base having relatively movable side frames and a central body pivotally mounted on said side frames midway between their ends, to provide for relative rocking movement between said side frames and said body, drill supporting means carried by said central body, supporting and propelling means by which said side frames are supported, and equalizer means including an equalizer element between and connected to the opposite ends of said side frames and extending across said body whereby said body is automatically maintained substantially horizontal as said supporting and propelling means travel over an uneven ground surface or floor.

4. In a drilling apparatus, a mobile base comprising side frames mounted for relatively tilting movement and a central body pivotally mounted at its forward end on the forward ends of said side frames, to provide for relative rocking movement in vertical planes between said side frames and said body, drill supporting means carried by said central body, supporting and propelling means by which said side frames are supported, and equalizer means including an equalizer element connected to and extending between said side frames with its intermediate portion extending across and engaging said body rearwardly of a point located midway lengthwise between the ends of said body for maintaining said body substantially horizontal irrespective of the tilted positions of said side frames relative to said body as said supporting and propelling means travel over an uneven ground surface or floor.

5. In drilling apparatus, a mobile base having side frames mounted for relative tilting movement and a central body pivotally mounted on said side frames, to provide for relative rocking movement in vertical planes between said side frames and said central body, drill supporting means carried by said central body, supporting and propelling means by which said side frames are supported, and equalizer means connected to and extending between said side frames with its intermediate portion engaging said body for maintaining said body substantially horizontal irrespective of the tilted positions of said side frames relative to said body as said supporting and propelling means travel over an uneven ground surface or floor, said equalizer means including a flexible element extending across and guided at the sides of said body and having connections at its ends with said side frames, and guiding means at the sides of said body for guiding said flexible element whereby the latter may move relative to said body during relative tilting of said body and side frames.

6. In a drilling apparatus, a mobile base having relatively movable side frames and a central body pivotally mounted on said side frames, to provide for relative rocking movement between said side frames and said central body, drill supporting means carried by said central portion, supporting and propelling means by which said side frames are supported, and equalizer means between and connected to said side frames and said body for automatically maintaining said body substantially horizontal while permitting tilting of said side frames relative to said body as said supporting and propelling means travel over an uneven ground surface or floor, said equalizer means including extensible hydraulic cylinder and piston devices connected between said side frames and the upper sides of said central body, and a free bypass connection between the cylinders of said devices whereby when one device is extended the other is automatically moved toward collapsed position.

7. In a drilling apparatus, a mobile base comprising side frames mounted for relative tilting movement and a central body pivotally mounted on said side frames, to provide for relative rocking movement in vertical planes between said side frames and said body, drill supporting means carried by said central body, a pair of front and rear wheels supporting each side frame and journaled thereon, a motor carried by each side frame for driving said side wheels in pairs, and manually operable control means on said central body and operatively connected to said motors for controlling the relative speeds of said motors to drive the pairs of side wheels at like or relatively different speeds to effect propulsion and steering of the apparatus by driving of said wheels.

8. In a drilling apparatus, a mobile base having supporting, propelling and steering means comprising propelling and steering devices at the sides of said base, an adjustable drill support on said base having a hydraulic adjusting device, independently operable hydraulic motors for separately driving said devices of said supporting, propelling and steering means to effect steering by driving, a motor driven pump for supplying liquid under pressure to said motors, and a separate motor driven pump for supplying liquid under pressure to said adjusting device.

9. In a drilling apparatus, a mobile base having supporting, propelling and steering means, an adjustable drill support on said base having a hydraulic adjusting device and carrying a compressed air drill whereby the latter may be adjusted into different drilling positions, independently operable hydraulic motors for driving said supporting, propelling and steering means to propel said base and to effect steering by driving, a liquid pump for supplying liquid under pressure to said hydraulic motors, an electric motor for driving said pump, an auxiliary liquid pump for supplying liquid under pressure to said adjusting device, a compressed air motor for driving said auxiliary pump, and common air supply means for supplying air under pressure to said compressed air motor and said compressed air drill.

10. In a drilling apparatus, a mobile base including a central body, side frames pivotally mounted for relative tilting movement in vertical planes and supported by propelling and steering devices, said side frames being independently tiltable relative to said central body, drill supporting means carried by said central body, and extensible jack devices mounted at the opposite ends of said central body at points spaced from said propelling and steering devices and engageable with the ground surface forwardly and rearwardly of said devices for removing a substantial portion of the weight of the apparatus from said independently tiltable frames of said propelling and steering devices during operation of the drill.

11. In a drilling apparatus, a mobile base having a central body and pivoted relatively movable side frames independently tiltable relative to said body, rubber tired supporting wheels for said side frames, drill supporting means on said central body, equalizer devices between said side frames and said body, and extensible floor engaging jacks at the opposite ends of said central body for removing a substantial portion of the weight of the apparatus from the rubber tired wheels during operation of the drill.

12. In a drilling apparatus, a mobile base including a central body and pivoted relatively movable side frames independently tiltable relative to said body and each having a pair of supporting and propelling wheels, drill supporting means carried by said central body, equalizer devices between the opposite ends of said body and said side frames for maintaining said body substantially horizontal while permitting tilting of said side frames relative to said body as the base travels over an uneven ground surface, and extensible jack devices at the opposite ends of said body and engageable with the ground surface for removing a substantial portion of the weight of the apparatus from said wheels during operation of the drill.

13. In a drilling apparatus, a mobile base having pairs of front and rear ground engaging traction devices at the sides thereof, for propelling and steering the apparatus, drill supporting means carried at the forward end of said base above said front traction devices near the center of gravity of the apparatus, a drilling tool carried by said supporting means, separate driving motors for said pairs of traction devices at each side of said base, said drilling tool and said supporting means substantially counterbalancing the weight of the apparatus rearwardly of said supporting means with the weight so distributed that a major portion of the weight is supported by said front traction devices, and means for independently controlling said motors to vary the relative speeds of said pairs of traction devices to effect lateral skidding of said rear traction devices which receive only a small portion of the weight as said devices are driven by said motors.

14. In a drilling apparatus, a mobile base having pairs of traction wheels at its sides, drill supporting means carried at the forward end of said base above the front wheels near the center of gravity of the apparatus, a drilling tool carried by said supporting means, means for driving said pairs of side wheels, the weight of the apparatus being so distributed that the drilling tool and its supporting means substantially counterbalances the weight of the apparatus rearwardly of said supporting means with the front wheels receiving a major portion of the weight and the rear wheels receiving only a relatively small portion of the weight, and means for independently controlling said driving means for said pairs of said wheels to vary their relative speeds to effect propulsion and steering of the apparatus, the rear traction wheels which receive only a small portion of the weight of the apparatus skidding sidewise through a wide arc to effect turning of said base about a forwardly located axis during the steering operation to swing the apparatus about the points of contact of the front traction wheels with the ground surface as said pairs of traction wheels are relatively driven.

15. In a drilling apparatus, a mobile base having pairs of front and rear ground engaging traction devices at the sides thereof for propelling and steering the apparatus, drill supporting means carried at the forward end of said base above said front traction devices near the center of gravity of the apparatus, a drilling tool carried by said supporting means, the drilling tool and said supporting means substantially counterbalancing the weight of the apparatus rearwardly of said supporting means with the weight so distributed that a major portion of the weight is supported by the front traction devices, and means for independently driving said side pairs of traction devices to vary their relative speeds to effect lateral skidding of said rear traction devices which receive only a small portion of the weight, said rear traction devices as they are driven skidding laterally through a wide arc about the points of contact of said front traction devices with the ground surface.

16. In a drilling apparatus, a mobile base having supporting, propelling and steering means comprising supporting, steering and propelling devices at the sides of said base, motor operated driving means for concurrently or separately driving said devices of said supporting, propelling and steering means to effect propulsion and steering by driving of said base, an adjustable drill jib mounting carried by said base and including a vertically swingable jib carrying a drilling tool, motor operated means on said base for vertically adjusting said jib to vary the elevation of said drilling tool, and separate power sources for said motor operated means respectively.

17. In a drilling apparatus, a mobile base having relatively movable side frames and a central body pivotally mounted on said side frames to provide for relative rocking movement between said side frames and said body, drill supporting means carried by said central body, supporting and propelling means by which said side frames are supported, and equalizer means between said side frames and said body for automatically maintaining said body substantially horizontal while permitting tilting of said side frames relative to said body as said supporting and propelling means travel over an uneven ground surface or floor, said equalizer means including hydraulic cylinders pivotally mounted at their lower ends on said side frames and containing reciprocable pistons having their piston rods pivotally connected to the upper portion of said central body and a free bypass conduit extending across said body between the lower ends of said cylinders beneath said pistons whereby when one cylinder is lowered the piston of the other cylinder is automatically raised.

18. In a drilling apparatus, a mobile base having relatively movable side frames and a central body pivotally mounted on said side frames, to provide for relative rocking movement between said side frames and said body, a drill supporting means carried by said central body, supporting and propelling means by which said side frames are supported, and equalizer means between said side frames and said body for automatically maintaining said body substantially horizontal as said supporting and propelling means travel over an uneven ground surface or floor, said equalizer means including a chain section extending across said body, said body having guide rolls at the sides thereof about which the end portions of said chain section pass, the end portions of said chain section extending upwardly from said guide rolls and attached at their ends to said side frames.

19. In a drilling apparatus, a mobile base having a central body and relatively movable side frames pivotally connected to said body independently to rock in vertical planes with respect to said body, ground engaging traction means for each side frame, drill supporting means carried at the forward end of said body intermediate said side frames and projecting forwardly in advance of said body and adapted to support a drilling tool at its outer extremity, and means carried at the rear ends of said side frames at the opposite sides of the rear end of said body providing stations or compartments for the drill operator and his helper.

20. In a drilling apparatus, a mobile base having relatively movable side frames and a central body pivotally mounted on said side frames, to provide for relative rocking movement between said side frames and said central body, drill supporting means carried by said central portion, supporting and propelling means by which said side frames are supported, equalizer means between said side frames and said body for automatically maintaining said body substantially horizontal while permitting tilting of said side frames relative to said body as said supporting and propelling means travel over an uneven ground surface or floor, said equalizer means including extensible hydraulic cylinder and piston devices connected between said side frames and the upper sides of said central body whereby when one device is extended the other is automatically moved toward collapsed position, a free bypass connection between the cylinders of said devices, and a normally open valve in said bypass connection which is closable for interrupting flow between said cylinders to lock said devices rigidly in position.

21. In a drilling apparatus, a mobile base having traction devices at the sides thereof for supporting, propelling and steering said base, drill supporting means carried at the forward end of said base near the center of gravity of the apparatus and extending forwardly in advance of said base and carrying a drilling tool, said drilling tool and said supporting means substantially counterbalancing the weight of the apparatus rearwardly of said supporting means whereby a major portion of the weight of the apparatus is received by the forward portions of said traction devices, means for driving said traction devices, and means for independently controlling said traction devices to effect propulsion and steering by driving of the apparatus, the rearward portions of said traction devices rearwardly of the center of gravity of the apparatus receiving only a relatively small portion of the weight of the apparatus so that when said traction devices are driven at relatively different speeds sluing of said traction devices is effected with their rearward portions moving through a relatively wide arc about the points of contact of said forward portions of said traction devices with the ground surface, thereby sharply to swing the apparatus horizontally either to the right or left to effect steering.

JOHN C. CURTIS.

References Cited in the file of this patent

UNITED STATES PATENTS

| Number | Name | Date |
|---|---|---|
| 298,625 | Saunders | May 13, 1884 |
| 773,112 | Adams | Oct. 25, 1904 |
| 1,098,014 | Carter | May 26, 1914 |
| 1,430,251 | Parker | Sept. 26, 1922 |
| 1,455,466 | Wickersham | May 15, 1923 |
| 1,885,295 | Robinson | Nov. 1, 1932 |
| 1,886,981 | Schull | Nov. 8, 1932 |
| 2,048,072 | Johansen | July 21, 1936 |
| 2,060,814 | Lewis | Nov. 17, 1936 |
| 2,073,823 | Anthony | Mar. 16, 1937 |
| 2,226,193 | Barrett | Dec. 24, 1940 |
| 2,381,109 | Cartlidge | Aug. 7, 1945 |
| 2,384,447 | Baldwin et al. | Sept. 11, 1945 |
| 2,409,843 | Feucht | Oct. 22, 1946 |